Dec. 15, 1959   W. K. ROQUEMORE   2,917,373
REACTION VESSEL
Filed Oct. 31, 1957   2 Sheets-Sheet 1

INVENTOR.
WILLIAM K. ROQUEMORE,
BY
ATTORNEY.

Dec. 15, 1959 W. K. ROQUEMORE 2,917,373
REACTION VESSEL
Filed Oct. 31, 1957 2 Sheets—Sheet 2

INVENTOR.
WILLIAM K. ROQUEMORE,
BY
ATTORNEY.

United States Patent Office 2,917,373
Patented Dec. 15, 1959

2,917,373

REACTION VESSEL

William K. Roquemore, Baytown, Tex., assignor, by mesne assignments, to Esso Research and Engineering Company, Elizabeth, N.J., a corporation of Delaware Application October 31, 1957, Serial No. 693,755

15 Claims. (Cl. 23—288)

The present invention is directed to a reactor suitable for use in catalytic conversion operations. More particularly, the invention is directed to an improved reactor provided with removably arranged baffle members in an annular stripping section. In its more specific aspects the invention is concerned with a baffle section which is suitable for use in an annular stripper of a fluidized solids reaction vessel.

The present invention may be briefly described as a reactor suitable for use in catalytic conversion operations in which fluidized solids are employed. The reactor comprises an elongated vertical vessel having internal insulation on its inner wall. An inlet for fluidized solids suspended in a vaporous medium is provided adjacent the lower end of the vessel and a first outlet for vaporous reactants is provided in the upper end of the vessel. A second outlet for fluidized solids is provided in the lower end of the vessel. An annular wall member is arranged in the vessel spaced away from the inner internal insulation on the inner wall and a plurality of baffle sections are removably arranged within the space between the annular wall member and the internal insulation. The baffle sections each comprise a plurality of rectangularly arranged elongated supporting members and vertically spaced apart triangularly shaped baffle members attached to the supporting members within the rectangular arrangement. Plate means are attached to the baffle members and to the supporting members and are arranged to close the sides of the baffle members. Stiffening means, such as plates, are attached to the supporting members on the sides of the rectangular arrangement other than the sides of the baffle members.

The present invention also includes a baffle section for use in an annular stripper of a fluidized solids reaction vessel, the baffle section comprising a plurality of rectangularly arranged elongated supporting members, vertically spaced apart triangularly shaped baffle members attached to the supporting members within the rectangular arrangement, and plate means attached to the baffle members and to the supporting members arranged to close the sides of the baffle members. Stiffening means, such as plates, are attached to the supporting members on the sides of the rectangular arrangement other than the sides of the baffle members.

The present invention also includes a plurality of interconnected baffle sections for use in an annular stripper.

The elongated supporting members are preferably angle irons and are preferably four in number arranged in a rectangular arrangement. The angle irons are removably attached to the annular wall and are spaced away from the internal insulation of the inner wall of the reactor vessel.

The triangularly shaped baffle members are provided with serrations on their lower ends and are arranged within the angle irons with their apices pointing upwardly. By virtue of this arrangement and by providing a plurality of the baffle members interconnected within the annular space and connected to the annular wall, a cascade effect is obtained with the downwardly flowing fluidized solids insuring effective stripping of any volatilizable matter which remains on the solids after the conversion operation.

Attached to each of the baffle members on each side thereof are bent plate means which serve to close the sides of the baffle members and provide for the efficient stripping operation obtained in the present invention.

The present invention will be more completely described by reference to the drawing in which.

Figure 1:
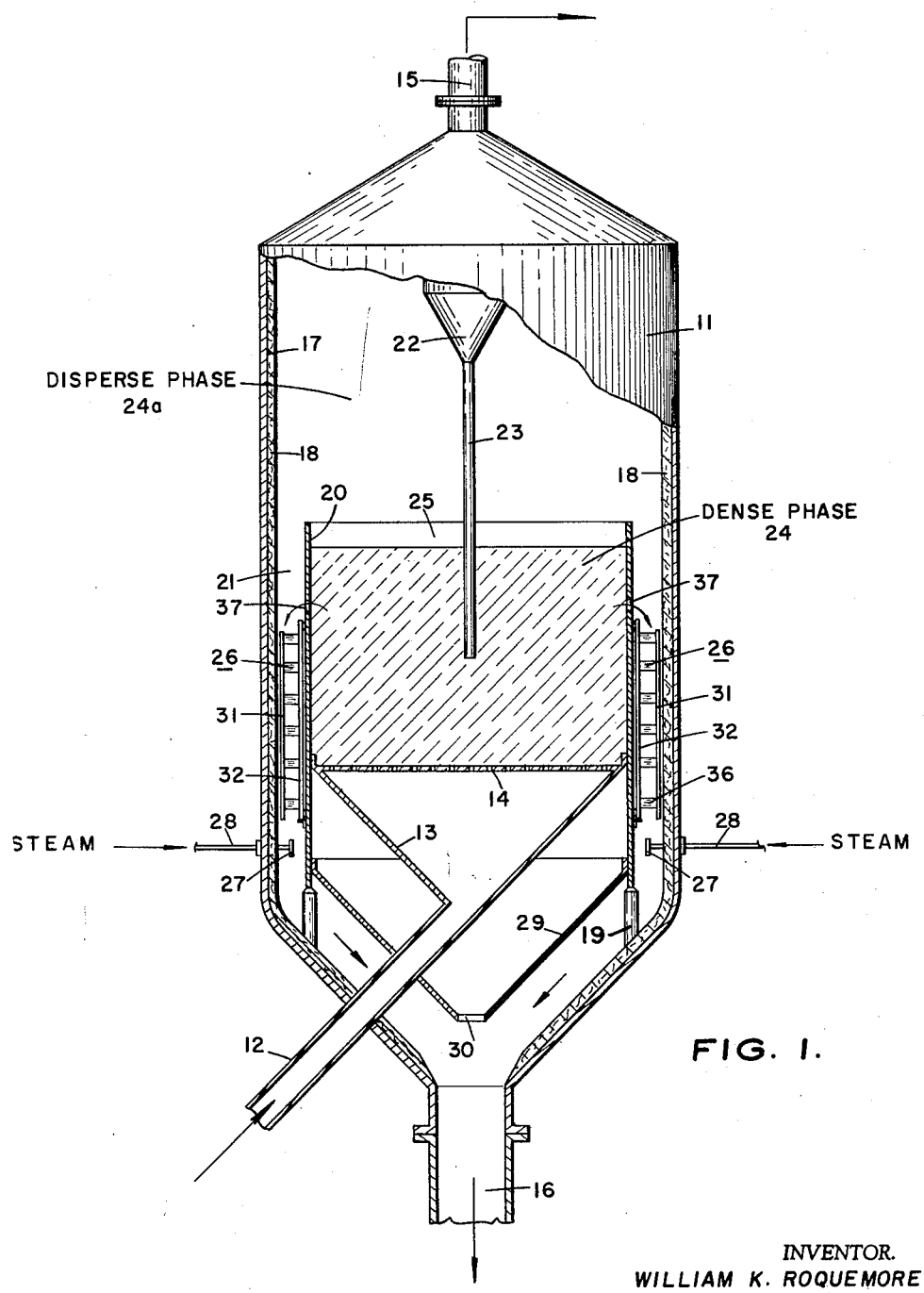
Fig. 1 is a partial sectional view showing the reactor of the present invention.

Referring now to the drawing in which identical numerals will be used to identify identical parts, and particularly to Fig. 1, numeral 11 designates a reactor vessel having an inlet 12 which terminates within the reactor vessel 11 intermediate its ends in a funnel shaped member 13 provided with a grid plate 14. Reactor vessel 11 is provided with a first outlet 15 on its upper end and a second outlet 16 on its lower end.

The inner wall 17 of reactor vessel 11 is lined with internal insulation 18 and arranged in the vessel on an annular supporting member 19 is an annular wall member 20 which forms an annular space 21.

A separating means 22 is arranged in the upper end of the reactor vessel 11 and is illustrated by a single cyclone separator, but which may be a plurality of cyclone separators or equivalent separating means. Cyclone separator 22 is provided with a dip leg 23 which extends to within a dense phase of fluidized solids 24 which is formed above the grid 14 and within the inner space 25 formed by the annular wall 20.

Arranged within the annular space 21 is a plurality of baffle sections 26 which will be described more fully hereinafter. Arranged below the baffle sections 26 in the annular space 21 is a plurality of nozzles 27 connected through the wall 18 of reactor vessel 11 to a conduit 28 through which a stripping medium such as steam is introduced into the annular space 21.

The lower end of the reactor vessel 11 may be provided with a conical wall member 29 having an opening 30 to isolate the dead space below the conical shaped member 13 from the catalyst flowing downwardly from space 21 into the outlet line 16. However, the conical wall member 29 provided with outlet 30 may be omitted as desired.

Figure 2:
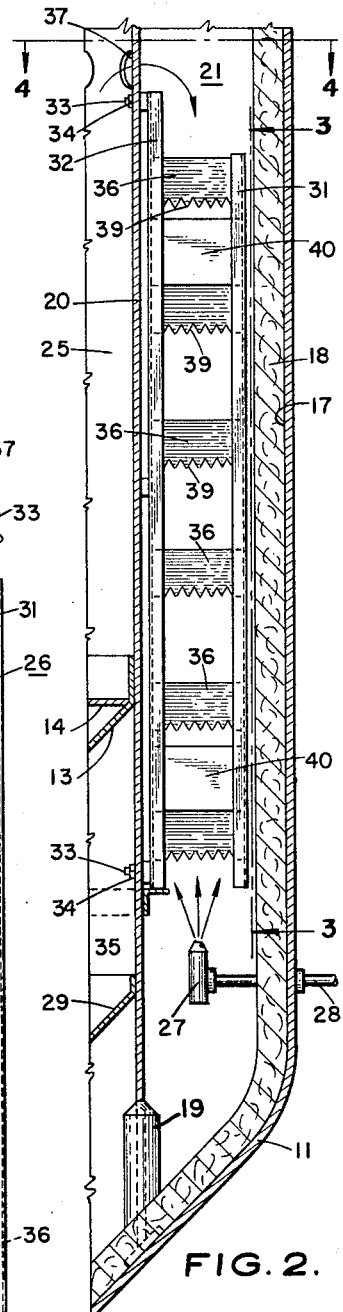
Fig. 2 is an enlarged partial sectional view of Fig. 1.

It is to be noted that the baffle sections 26 are formed from elongated supporting members such as angle irons 31 and 32, angle irons 32 being of a greater length than angle irons 31. As shown in Fig. 2, the angle irons 32 are removably attached to the wall 20 by means of threaded studs 33 and nuts 34, which allows the angle irons 32 and 31 to be removably attached to the inner wall, it being noted that the angle irons 31 are spaced away from and are not attached to the insulation 18 on the wall 17. It is to be further noted that the lower ends of the angle irons 32 are supported on an annular angle iron 35, which may be suitably welded or bolted to the annular wall 20.

Figure 4:
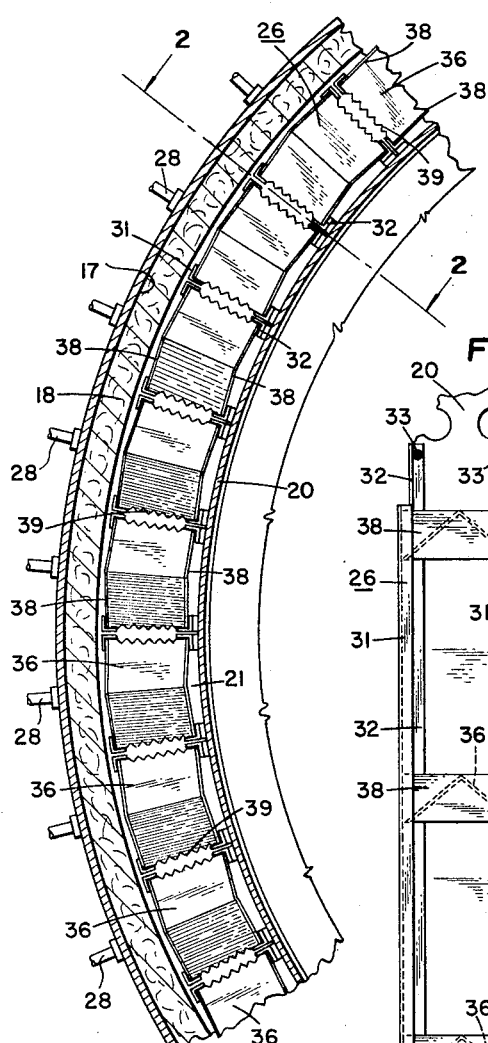
Fig. 4 is a view taken along the lines 4—4 of Fig. 2.
Figure 3:
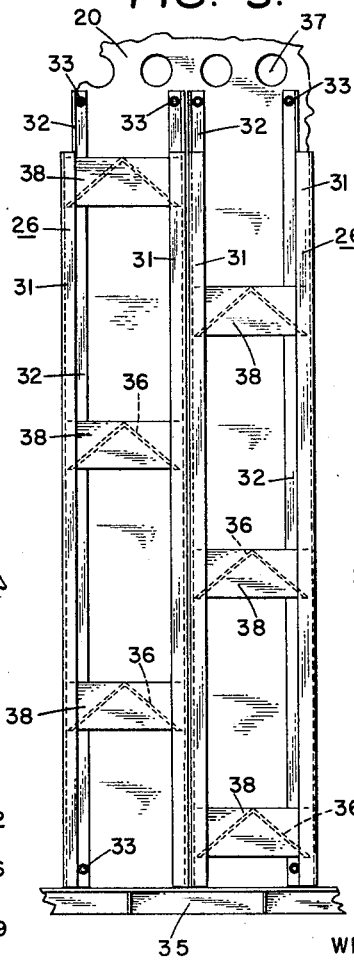
Fig. 3 is a view taken along the lines 3—3 of Fig. 2.

Arranged within the rectangular arrangement of the angle irons 31 and 32 are a plurality of triangularly shaped baffle members 36, which are vertically spaced apart within the rectangular arrangement to provide a cascade effect when several of the angle irons and the baffle members are arranged together and interconnected as shown more clearly in Figs. 3 and 4.

It is to be noted in the several figures of the drawing that the baffle sections 26 are arranged in the annular space 21 below a plurality of ports 37 which provides for overflow of catalyst from the dense phase 24 into the annular space 21.

Figure 5:
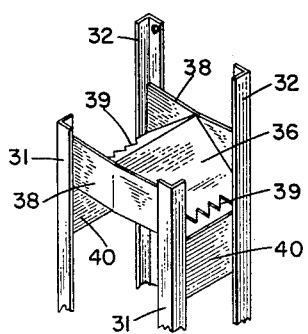
Fig. 5 is a perspective view of a portion of a baffle section in accordance with the present invention.

As shown more clearly in Figs. 3, 4 and 5, the sides of the triangular shaped baffle members 36 are closed by plate members 38 which are bent to close the triangular shaped baffle members 36.

It is to be further noted that the lower ends of the triangular shaped baffle members 36 are serrated with serrations 39 for passage of the fluidized solid particles in a cascade effect through the baffle sections 26.

As shown more clearly in Fig. 5, the baffle sections 26 are provided with stiffening plates 40 which are arranged on the sides of the rectangular arrangements other than the sides on which the bent plates are arranged which closes the sides of the triangular baffle members 26. The stiffening plates 40 may be placed in staggered relationship one to the other to provide the necessary stiffness or strength to the baffle sections 26. It is to be noted that the triangular baffle members 36 are vertically spaced apart one from the other and that several sections 26 may be arranged to provide a staggered effect, as shown in Fig. 3, for the baffle members 36. Catalysts falling downwardly through the ports 37 are thus caused to travel cascade-like downwardly through the annular space 21 countercurrent to the stripping medium, such as steam, introduced through the nozzles 27.

The present invention is quite advantageous and useful inasmuch as it permits the arrangement of baffle members removably within annular strippers of fluidized solids reaction vessels, such as reaction vessels employing the fluidized solids technique in the catalytic conversion of hydrocarbons, such as in catalytic cracking of hydrocarbons employing a fluidized silica-alumina catalyst. An overall improvement in stripping efficiency is obtained by removing volatilizable carbonaceous material from the catalyst which overflows into the space 21 through the ports 37.

In an actual practice, a plurality of the baffle sections, which may be forty in number, are constructed so that they are installed one at a time and then connected together after placement in the annular stripping space 21. No attachment is made to the internal insulation on the outer shell of the reaction vessel. Each of the forty baffle sections may be removed independently from the other to permit insulation repair. Each baffle section may comprise three separate shed baffle members supported one above the other as has been described and maintained in place with angle iron supporting members. Adjacent baffle sections have their baffle members spaced such that a cascade flow of catalyst is obtained.

Prior to the present invention it had been the practice to employ vertical metal fins in the annular space of stripping sections of catalytic cracking vessels. The vertical fins were welded on one edge and that was on the inner section and resulted in approximately 25 to 30 percent of the fins being broken off during each operation of an extended period of time. This necessitated major mechanical repairs to the stripper during each shutdown for general overhaul of the catalytic cracking unit. It was observed that the broken fins usually blocked off about 25 to 30 percent of the annular cross-sectional area of the stripping space and adversely affected the stripper efficiency. If the fins were removed, the stripping efficiency would be impaired unless suitable baffling arrangement were installed. Heretofore it was not possible to install suitable baffling arrangement without welding them to the outer vessel shell, which was complicated because of the requirement of internally insulating the outer shell of the reaction vessel. In accordance with the present invention, it is now possible to eliminate the use of the vertical fins and to provide baffles which do not require attachment to the inner wall of the reaction vessel. The present invention provides baffle sections which are attached removably only to the inner annular wall of the stripping section and allows ready removal of the stripping sections without disturbing the insulation.

The present invention is quite advantageous and useful and gives exceedingly good contact between the fluidized solids such as stripped in catalytic cracking operations and the stripping medium, which may be steam, but which may be other types of gases.

Referring again to Fig. 1, a mixture of vaporized hydrocarbons in which is suspended a fluidized catalyst, such as silica-alumina having particle sizes in the range from about 10 to about 200 microns, is introduced from a source not shown through inlet line 12 and flows upwardly through conical member 13 and through the openings of the grid 14 to form the dense bed 24. In the dense bed 24 a cracking reaction or other conversion operation may be conducted with the reaction products and some of the catalyst then passing into a disperse phase, such as 24a, above the dense bed 24. Residual catalyst is separated from the reactants in disperse phase 24a by passage through the cyclone separator 22 with the reactants discharging through outlet 15 for recovery and further treating. The catalyst overflows from dense phase 24 through ports 37 into annular stripping space 21 and flows downwardly through the baffle sections 26 countercurrent to the flow of stripping steam introduced through nozzle 27 and line 28. By virtue of the good contact obtained in the baffle sections 26, carbonaceous and volatilizable material are effectively removed from the spent catalyst and mingle in the disperse phase 24a with the reactants for recovery thereof. A reduction in strippable carbon, which is attributed to the present invention, of about 50 percent has been obtained over the prior installation. The stripped catalyst flows downwardly through the space 21 to outlet 16 for regeneration of the spent catalyst.

The nature and objects of the present invention having been completely described and illustrated, what I wish to claim as new and useful and secure by Letters Patent is:

1. A reactor suitable for use in catalytic conversion operations in which fluidized solids are employed which comprises an elongated vertical vessel having internal insulation on its inner wall, an inlet for fluidized solids suspended in a vaporous medium adjacent the lower end of the vessel, a first outlet for vaporous reactants in the upper end of the vessel, a second outlet for fluidized solids in the lower end of the vessel, an annular wall member in said vessel spaced away from the inner internal insulation, and a plurality of independent baffle sections removably arranged within the space between the annular wall member and the internal insulation, and removably attached to the annular wall member, said baffle sections each comprising a plurality of rectangularly arranged elongated supporting members, vertically spaced apart triangularly shaped baffle members attached to said supporting members within the rectangular arrangement, plate means attached to said baffle members and to said supporting members and arranged to close the sides of said baffle members, and stiffening means attached to said supporting members on the sides of said rectangular arrangement other than the sides of the baffle members.

2. A reactor suitable for use in catalytic conversion operations in which fluidized solids are employed which comprises an elongated vertical vessel having internal insulation on its inner wall, an inlet for fluidized solids suspended in a vaporous medium adjacent the lower end of the vessel, a first outlet for vaporous reactants in the upper end of the vessel, a second outlet for fluidized solids in the lower end of the vessel, an annular wall member in said vessel spaced away from the inner internal insulation, and a plurality of independent baffle sections removably arranged within the space between the annular wall member and the internal insulation, and removably attached to the annular wall member, said baffle sections each comprising a plurality of rectangularly arranged elongated supporting members, vertically spaced apart triangularly shaped baffle members having upwardly pointing apices and attached to said supporting members within the rectangular arrangement, bent plate means attached to said baffle members and to said supporting members and arranged to close the sides of said baffle members, and stiffening means attached to said supporting members on the sides of said rectangular arrangement other than the sides of the baffle members.

3. A reactor suitable for use in catalytic conversion operations in which fluidized solids are employed which comprises an elongated vertical vessel having internal insulation on its inner wall, an inlet for fluidized solids suspended in a vaporous medium adjacent the lower end of the vessel, a first outlet for vaporous reactants in the upper end of the vessel, a second outlet for fluidized solids in the lower end of the vessel, an annular wall member in said vessel spaced away from the inner internal insulation, and a plurality of independent baffle sections removably arranged within the space between the annular wall member and the internal insulation, and removably attached to the annular wall member, said baffle sections each comprising a plurality of rectangularly arranged elongated supporting members, vertically spaced apart triangularly shaped baffle members having upwardly pointing apices and provided with serrated lower edges, said baffle members being attached to said supporting members within the rectangular arrangement, bent plate means attached to said baffle members and to said supporting members and arranged to close the sides of said baffle members, and stiffening means attached to said supporting members on the sides of said rectangular arrangement other than the sides of the baffle members.

4. A reactor suitable for use in catalytic conversion operations in which fluidized solids are employed which comprises an elongated vertical vessel having internal insulation on its inner wall, an inlet for fluidized solids suspended in a vaporous medium adjacent the lower end of the vessel, a first outlet for vaporous reactants in the upper end of the vessel, a second outlet for fluidized solids in the lower end of the vessel, an annular wall member in said vessel spaced away from the inner internal insulation, and a plurality of independent baffle sections removably arranged within the space between the annular wall member and the internal insulation, and removably attached to the annular wall member, said baffle sections each comprising a plurality of rectangularly arranged elongated angle iron supporting members, vertically spaced apart triangularly shaped baffle members having upwardly pointing apices and provided with serrated lower edges, said baffle members being attached to said supporting members within the rectangular arrangement, plate means attached to said baffle members and to said supporting members and arranged to close the sides of said baffle members, and stiffening means attached to said supporting members on the sides of said rectangular arrangement other than the sides of the baffle members.

5. A reactor suitable for use in catalytic conversion operations in which fluidized solids are employed which comprises an elongated vertical vessel having internal insulation on its inner wall, an inlet for fluidized solids suspended in a vaporous medium adjacent the lower end of the vessel, a first outlet for vaporous reactants in the upper end of the vessel, a second outlet for fluidized solids in the lower end of the vessel, an annular wall member in said vessel spaced away from the inner internal insulation, and a plurality of independent baffle sections removably arranged within the space between the annular wall member and the internal insulation, said baffle sections being removably attached to the annular wall member, said baffle sections each comprising a plurality of rectangularly arranged elongated supporting members, vertically spaced-apart triangularly shaped baffle members attached to said supporting members within the rectangular arrangement, plate means attached to said baffle members and to said supporting members and arranged to close the sides of said baffle members, and stiffening means attached to said supporting members on the sides of said rectangular arrangement other than the sides of the baffle members.

6. A reactor in accordance with claim 5 in which means are provided for injecting a stripping medium into the annular space below the baffle sections.

7. A reactor in accordance with claim 5 in which a grid is provided in said vessel forming the terminus of the inlet intermediate the ends of the vessel.

8. A reactor suitable for use in catalytic conversion operations in which fluidized solids are employed which comprises an elongated vertical vessel having internal insulation on its inner wall, an inlet for fluidized solids suspended in a vaporous medium adjacent the lower end of the vessel, a first outlet for vaporous reactants in the upper end of the vessel, a second outlet for fluidized solids in the lower end of the vessel, an annular wall member in said vessel spaced away from the inner internal insulation, and a plurality of interconnected independent baffle sections arranged within the space between the annular wall member and the internal insulation, said baffle sections being removably attached to the annular wall member, said baffle sections each comprising a plurality of rectangularly arranged elongated angle iron supporting members, vertically spaced-apart triangularly shaped baffle members having upwardly pointing apices and provided with serrated lower edges, said baffle members being attached to said supporting members within the rectangular arrangement, bent plate means attached to said baffle members and to said supporting members and arranged to close the sides of said baffle members, and stiffening plate means attached to said supporting members on the sides of said rectangular arrangement other than the sides of the baffle members.

9. An independent baffle section for use in an annular stripper and for attachment removably to an inner wall spaced from an outer wall of a fluidized solids reaction vessel which comprises a plurality of rectangularly arranged elongated supporting members, vertically spaced-apart triangularly shaped baffle members attached to said supporting members within the rectangular arrangement, plate means attached to said baffle members and to said supporting members and arranged to close the sides of said baffle members, and stiffening means attached to said supporting members on the sides of said rectangular arrangement other than the sides of the baffle members.

10. An independent baffle section for use in an annular stripper and for attachment removably to an inner wall spaced from an outer wall of a fluidized solids reaction vessel which comprises a plurality of rectangularly arranged elongated supporting members, vertically spaced-apart triangularly shaped baffle members attached to said supporting members within the rectangular arrangement, bent plate means attached to said baffle members and to said supporting members and arranged to close the sides of said baffle members, and stiffening means attached to said supporting members on the sides of said rectangular arrangement other than the sides of the baffle members.

11. An independent baffle section for use in an annular stripper and for attachment removably to an inner wall spaced from an outer wall of a fluidized solids reaction vessel which comprises a plurality of rectangularly arranged elongated supporting members, vertically spaced-apart triangularly shaped baffle members attached to said supporting members within the rectangular arrangement, said baffle members having serrated lower edges, plate means attached to said baffle members and to said supporting members and arranged to close the sides of said baffle members, and stiffening means attached to said supporting members on the sides of said rectangular arrangement other than the sides of the baffle members.

12. An independent baffle section for use in an annular stripper and for attachment removably to an inner wall spaced from an outer wall of a fluidized solids reaction vessel which comprises a plurality of rectangularly arranged elongated angle iron supporting members, vertically spaced-apart triangularly shaped baffle members attached to said supporting members within the rectangular arrangement, plate means attached to said baffle members and to said supporting members and arranged to close the sides of said baffle members, and stiffening means attached to said supporting members on the sides of said rectangular arrangement other than the sides of the baffle members.

13. An independent baffle section for use in an annular stripper and for attachment removably to an inner wall spaced from an outer wall of a fluidized solids reaction vessel which comprises a plurality of rectangularly arranged elongated supporting members, vertically spaced-apart triangularly shaped baffle members attached to said supporting members within the rectangular arrangement, said baffle members having serrated lower edges, bent plate means attached to said baffle members and to said supporting members and arranged to close the sides of said baffle members, and stiffening means attached to said supporting members on the sides of said rectangular arrangement other than the sides of the baffle members.

14. An independent baffle section for use in an annular stripper and for attachment removably to an inner wall spaced from an outer wall of a fluidized solids reaction vessel which comprises a plurality of rectangularly arranged elongated angle iron supporting members, vertically spaced-apart triangularly shaped baffle members attached to said supporting members within the rectangular arrangement, said baffle members having serrated lower edges, bent plate means attached to said baffle members and to said supporting members and arranged to close the sides of said baffle members, and stiffening plate means attached to said supporting members on the sides of said rectangular arrangement other than the sides of the baffle members.

15. Apparatus for use in an annular stripper and for attachment removably to an inner wall spaced from an outer wall of a fluidized solids reaction vessel which comprises a plurality of interconnected independent baffle sections each of which baffle sections comprises a plurality of rectangularly arranged elongated supporting members, vertically spaced-apart triangularly shaped baffle members attached to said supporting members within the rectangular arrangement, plate means attached to said baffle members and to said supporting members and arranged to close the sides of said baffle members, and stiffening means attached to said supporting members on the sides of said rectangular arrangement other than the sides of the baffle members, the baffle members of each section being staggered with respect to the baffle members of the next adjacent section.

References Cited in the file of this patent
UNITED STATES PATENTS

| | | |
|---|---|---|
| 2,436,225 | Ogorzaly | Feb. 17, 1948 |
| 2,458,866 | Martin | Jan. 11, 1949 |
| 2,545,165 | Ogorzaly | Mar. 13, 1951 |